US011243617B2

United States Patent
Trethewey et al.

(10) Patent No.: US 11,243,617 B2
(45) Date of Patent: Feb. 8, 2022

(54) MULTI-FUNCTION STYLUS WITH SENSOR CONTROLLER

(71) Applicant: Intel Corporation, Santa Clara, CA (US)

(72) Inventors: James Trethewey, Hillsboro, OR (US); Charlie Case, Jr., Lake Oswego, OR (US); Jorge Martinez, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/118,950

(22) Filed: Dec. 11, 2020

(65) Prior Publication Data

US 2021/0165505 A1 Jun. 3, 2021

Related U.S. Application Data

(63) Continuation of application No. 16/865,669, filed on May 4, 2020, which is a continuation of application No. 13/687,167, filed on Nov. 28, 2012, now Pat. No. 10,642,376.

(51) Int. Cl.
*G06F 3/0346* (2013.01)
*G06F 3/0488* (2013.01)
*G06F 3/0354* (2013.01)

(52) U.S. Cl.
CPC ........ *G06F 3/0346* (2013.01); *G06F 3/03545* (2013.01); *G06F 3/0488* (2013.01)

(58) Field of Classification Search
None
See application file for complete search history.

(56) References Cited

U.S. PATENT DOCUMENTS

| 5,420,607 A | 5/1995 | Miller et al. |
| 5,825,350 A | 10/1998 | Case, Jr. et al. |
| 6,226,000 B1 | 5/2001 | Richens et al. |
| 10,642,376 B2 | 5/2020 | Trethewey et al. |
| 2003/0073610 A1 | 4/2003 | Lindquist et al. |
| 2003/0076310 A1 | 4/2003 | Kanzaki et al. |
| 2003/0117408 A1 | 6/2003 | Forsline et al. |

(Continued)

FOREIGN PATENT DOCUMENTS

| CN | 101872259 | 10/2010 |
| CN | 101872260 | 10/2010 |

OTHER PUBLICATIONS

Rigg, Jamie, "Sony tries to patent stylus with friction-based haptic feedback", posted on Nov. 22, 2012, 7 pages, available at: http://www.engadget.com/2012/11/22/sony-haptic-feedback-stylus-patent.

(Continued)

*Primary Examiner* — Aneeta Yodichkas
(74) *Attorney, Agent, or Firm* — Hanley, Flight & Zimmerman, LLC

(57) ABSTRACT

A system and method for transmitting an input value to a computing device are included herein. The method includes detecting sensor data in a stylus. The method also includes detecting a gesture event with the stylus. In addition, the method includes generating an input value based on the sensor data and the gesture event. Furthermore, the method includes sending the input value from the stylus to a computing device.

25 Claims, 5 Drawing Sheets

(56) References Cited

U.S. PATENT DOCUMENTS

| | | |
|---|---|---|
| 2005/0116940 A1 | 6/2005 | Dawson |
| 2007/0079030 A1 | 4/2007 | Okuley et al. |
| 2007/0139392 A1 | 6/2007 | Kim |
| 2007/0279875 A1 | 12/2007 | Bell et al. |
| 2008/0066000 A1 | 3/2008 | Ofek et al. |
| 2008/0084189 A1 | 4/2008 | Kim |
| 2008/0303646 A1 | 12/2008 | Elwell et al. |
| 2009/0091396 A1 | 4/2009 | Jian et al. |
| 2009/0135164 A1 | 5/2009 | Kyung et al. |
| 2010/0079602 A1 | 4/2010 | Napper et al. |
| 2010/0318710 A1 | 12/2010 | Downing et al. |
| 2011/0090726 A1 | 4/2011 | Brotto et al. |
| 2011/0164000 A1 | 7/2011 | Pance |
| 2011/0279081 A1 | 11/2011 | Cacioppo et al. |
| 2012/0081299 A1 | 4/2012 | Xiao et al. |
| 2012/0127088 A1* | 5/2012 | Pance ............... G06F 3/041 345/173 |
| 2012/0153026 A1 | 6/2012 | Bohn et al. |
| 2012/0171657 A1 | 7/2012 | Ortins et al. |
| 2012/0206330 A1 | 8/2012 | Cao et al. |
| 2012/0331546 A1 | 12/2012 | Falkenburg et al. |
| 2013/0044057 A1 | 2/2013 | Saito |
| 2013/0106782 A1 | 5/2013 | Nowatzyk et al. |
| 2013/0201162 A1 | 8/2013 | Cavilia |
| 2013/0229390 A1 | 9/2013 | DiVerdi |
| 2013/0249823 A1 | 9/2013 | Ahn et al. |
| 2013/0271431 A1 | 10/2013 | Besperstov |
| 2014/0002338 A1 | 1/2014 | Raffa et al. |
| 2014/0035883 A1 | 2/2014 | Mercea et al. |
| 2014/0043245 A1 | 2/2014 | Dowd et al. |
| 2014/0051940 A1 | 2/2014 | Messerschmidt |
| 2014/0071147 A1 | 3/2014 | Trethewey et al. |
| 2014/0075178 A1 | 3/2014 | Trethewey |
| 2014/0078116 A1* | 3/2014 | Mercea ............... G06F 3/03545 345/179 |
| 2014/0092069 A1* | 4/2014 | Bentov ............... G06F 1/26 345/179 |
| 2014/0098033 A1 | 4/2014 | Simmons |
| 2014/0108927 A1 | 4/2014 | Vaidya et al. |
| 2014/0146021 A1 | 5/2014 | Trethewey et al. |
| 2014/0149062 A1 | 5/2014 | Chandrasekaran et al. |
| 2014/0267121 A1 | 9/2014 | Luo |
| 2014/0340318 A1 | 11/2014 | Stringer |
| 2020/0272257 A1 | 8/2020 | Kumar et al. |
| 2021/0165504 A1 | 6/2021 | Trethewey et al. |

OTHER PUBLICATIONS

Gyration, "Motion-Sensing Technology", Gyration Technology, retrieved on Dec. 7, 2012, 2 pages, available at: http://www.gyration.com/pages/gyration-technology.

N-trig, "DuoSense.RTM. Pen", Technology Pen, retrieved on Dec. 7, 2012, 3 pages, available at: http://www.ntrig.com/Content.aspxPage=DigitalPencil.

Wacom, "Bamboo Stylus", retrieved on Dec. 7, 2012, 6 pages, available at: http://www.wacom.com/products/stylus.

United States Patent and Trademark Office, "Non-Final Office Action," issued in connection with U.S. Appl. No. 16/865,669, dated Apr. 8, 2021, 12 pages.

United States Patent and Trademark Office, "Final Office Action," issued in connection with U.S. Appl. No. 13/687,167, dated Jan. 16, 2015, 30 pages.

United States Patent and Trademark Office, "Final Office Action," issued in connection with U.S. Appl. No. 13/687,167, dated Nov. 14, 2016, 18 pages.

United States Patent and Trademark Office, "Final Office Action," issued in connection with U.S. Appl. No. 13/687,167, dated Oct. 11, 2017, 18 pages.

United States Patent and Trademark Office, "Non-Final Office Action," issued in connection with U.S. Appl. No. 13/687,167, dated Jul. 30, 2014, 27 pages.

United States Patent and Trademark Office, "Non-Final Office Action," issued in connection with U.S. Appl. No. 13/687,167, dated May 6, 2016, 14 pages.

United States Patent and Trademark Office, "Non-Final Office Action," issued in connection with U.S. Appl. No. 13/687,167, dated Jun. 7, 2017, 15 pages.

United States Patent and Trademark Office, "Notice of Allowance," issued in connection with U.S. Appl. No. 13/687,167, dated Jan. 9, 2020, 7 pages.

United States Patent and Trademark Office, "Examiner's Answer," issued in connection with U.S. Appl. No. 13/687,167, dated May 15, 2018, 18 pages.

United States Patent and Trademark Office, "Decision on Appeal," issued in connection with U.S. Appl. No. 13/687,167, dated Oct. 22, 2019, 6 pages.

United States Patent and Trademark Office, "Final Office Action," issued in connection with U.S. Appl. No. 16/865,669, dated Jul. 23, 2021, 16 pages.

United States Patent and Trademark Office, "Notice of Allowance," issued in connection with U.S. Appl. No. 16/865,669, dated Sep. 24, 2021, 11 pages.

United States Patent and Trademark Office, "Notice of Allowance," issued in connection with U.S. Appl. No. 16/871,981, dated Sep. 1, 2021, 8 pages.

* cited by examiner

300

MULTI-FUNCTION STYLUS WITH SENSOR CONTROLLER

RELATED APPLICATIONS

This patent arises from a continuation of U.S. patent application Ser. No. 16/865,669, filed on May 4, 2020, and entitled "MULTI-FUNCTION STYLUS WITH SENSOR CONTROLLER.". U.S. patent application Ser. No. 16/865,669 is a continuation of U.S. patent application Ser. No. 13/687,167 (now U.S. Pat. No. 10,642,376), filed on Nov. 28, 2012, and entitled "MULTI-FUNCTION STYLUS WITH SENSOR CONTROLLER." U.S. patent application Ser. No. 16/865,669 and U.S. patent application Ser. No. 13/687,167 are hereby incorporated by reference in their entireties. Priority to U.S. patent application Ser. No. 16/865,669 and U.S. patent application Ser. No. 13/687,167 is hereby claimed.

TECHNICAL FIELD

This disclosure relates generally to a stylus for a computing system and more specifically, but not exclusively, to a stylus with a sensor controller.

BACKGROUND

Modern computing devices continue to incorporate a growing number of components. For example, modern computing devices may include styli that can be used to provide input to a computing device. In some embodiments, a stylus may include sensors that can provide additional information to the computing device about the operating environment of the stylus. In some examples, the sensors may include an accelerometer, a gyrometer, or a compass. An accelerometer may detect the change in velocity of a computing device. In some embodiments, a gyrometer may detect the angular velocity of the computing device. A compass may detect the cardinal direction the computing device is traveling. As the number of sensors included in a stylus increases, the amount of sensor data that can be transmitted to a computing device also increases.

DETAILED DESCRIPTION

According to embodiments of the subject matter disclosed herein, a stylus comprising a sensor controller can detect sensor data from sensors and transmit an input value based on sensor data and a gesture event to a computing device. A stylus, as referred to herein, includes any suitable electronic device that can detect an input value and transmit the input value to a computing device. In some embodiments, the stylus can transmit data to a computing device by placing the stylus in contact with a display device for a computing system. In some embodiments, the stylus can transmit data to a computing device through a data exchange protocol, such as Bluetooth, USB, WIFI, or Zigbee, among others. For example, the stylus may detect an input value and transmit the input value to a computing system through a data exchange protocol while the stylus is not proximate to the display device of the computing system. In some embodiments, the stylus can transmit data to a computing device through a cable.

In some embodiments, the stylus may calculate an input value based on sensor data and a gesture event. The sensor data may be detected from any suitable number of sensors such as a compass (also referred to herein as a magnetometer), an accelerometer, or a gyrometer (also referred to herein as a gyroscope) inertial sensors, a microphone, a piezo element, touch sensors, among others. In some embodiments, the gesture event can include a movement of the stylus that corresponds with an input operation. For example, certain movements of the stylus may correspond with certain keyboard input values or mouse input values, among others. In some embodiments, a keyboard input value can include an alphanumeric character, among others and a mouse input value can represent a cursor in two dimensional space or a selection of a portion of a graphical user interface, among others.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
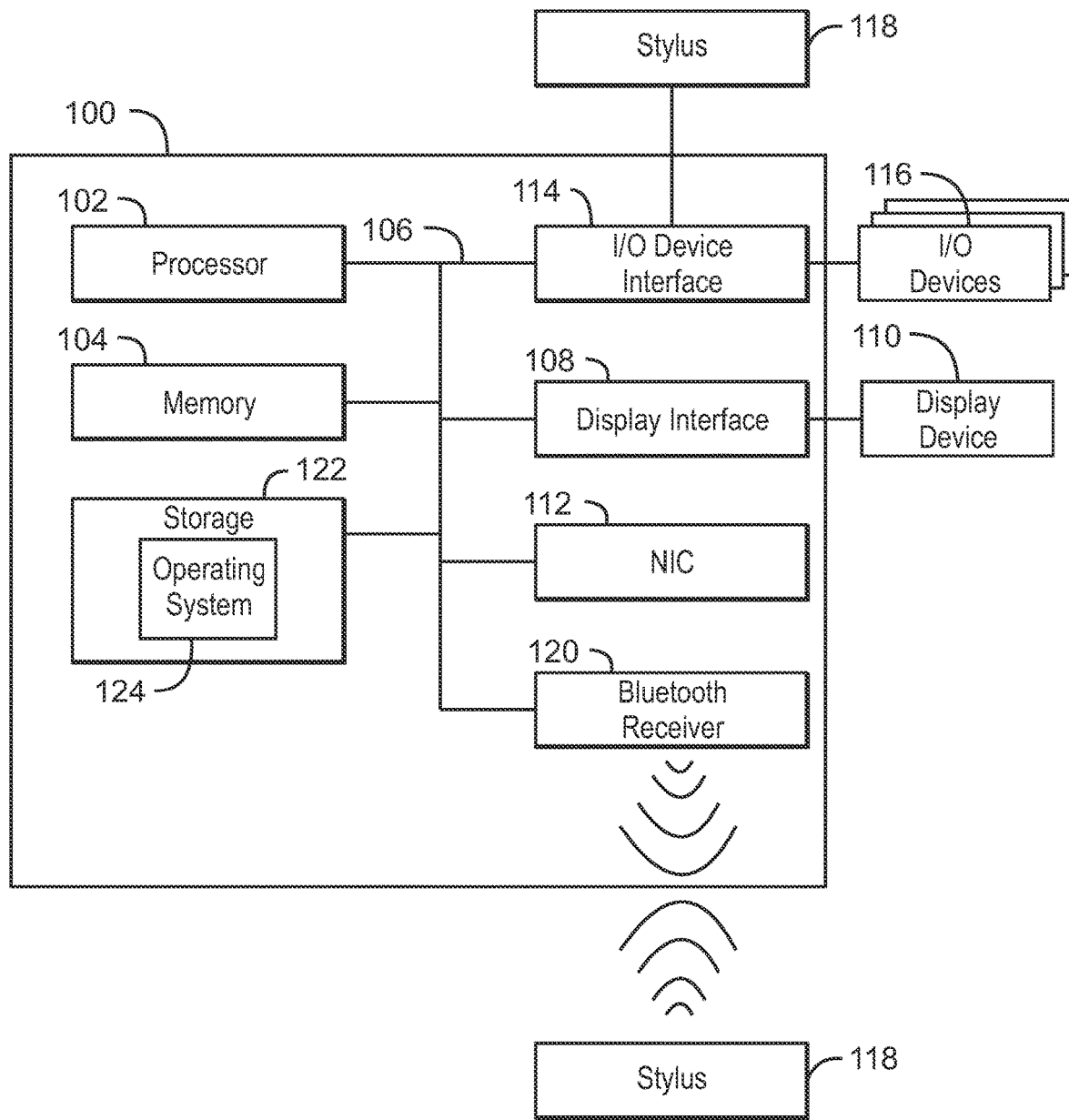
FIG. 1 is a block diagram of an example of a computing system connected to a stylus that generates an input value based on sensor data and a gesture event.

FIG. 1 is a block diagram of an example of a computing system connected to a stylus that generates an input value based on sensor data and a gesture event. The computing system 100 may be, for example, a mobile phone, laptop computer, computer, desktop computer, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 104 can be used to store computer-readable instructions that, when executed by the processor, direct the processor to perform various operations in accordance with embodiments described herein. For example, the instructions that are executed by the processor 102 may be used to implement a method that detects sensor data and a gesture event and transmits an input value based on the sensor data and the gesture event to a computing system 100.

The processor 102 may also be linked through the system interconnect 106 to a display interface 108 adapted to connect the computing system 100 to a display device 110. The display device 110 may include a display screen that is a built-in component of the computing system 100. The display device 110 may also include a computer monitor, television, or projector, among others, that is externally connected to the computing system 100. The processor 102 may also be linked through the system interconnect 106 to a network interface card (NIC) 112. The NIC 112 may be adapted to connect the computing system 100 through the system interconnect 106 to a network (not depicted). The network may be a wide area network (WAN), local area network (LAN), or the Internet, among others.

The processor 102 may be connected through a system interconnect 106 (e.g., PCI, ISA, PCI-Express®, Hyper-Transport®, NuInterconnect, etc.) to an input/output (I/O) device interface 114 adapted to connect the computing system 100 to one or more I/O devices 116. The I/O devices 116 may include, for example, a keyboard and a pointing device, wherein the pointing device may include a touchpad or a touchscreen, among others. The I/O devices 116 may be built-in components of the computing system 100, or may be devices that are externally connected to the computing system 100. The I/O device interface 114 may also be adapted to connect the computing system 100 to a stylus 118. The stylus 118 may be any suitable electronic device that can detect an input value and transmit the input value to a computing device. For example, a stylus 118 may be an electronic pen that can provide input to a computing system 100 when the stylus 118 contacts a display device 110. In some examples, the stylus 118 can transmit data to a computing system 100 wirelessly through a Bluetooth receiver 120. A Bluetooth receiver 120 can enable wireless data transmission between a stylus 120 and the computing system 100 using a radio technology, such as a frequency-hopping spread spectrum, among others. In some embodiments, the stylus 118 may include sensors that detect sensor data regarding the operating environment of the stylus 118. For example, the sensors may detect the tilt of the stylus 118, the acceleration of the stylus 118, or the cardinal direction the stylus 118 is pointed, among others. In some examples, the stylus 118 may also detect a gesture event that corresponds with the motion of the stylus 118. For example, certain patterns detected by the stylus 118 may correspond with various input operations, such as operations that transmit alphanumeric characters, sign language operations or directional indication through pointing, among others. In some embodiments, the stylus 118 may use the sensor data together with a gesture event to generate an input value to send to the computing device 100. For example, the stylus 118 may adjust the gesture event to account for the tilt, acceleration, or other operational states of the stylus 118.

The computing device 100 may also include a storage device 122. The storage device 122 may include a physical memory such as a hard drive, an optical drive, a flash drive, an array of drives, or any combinations thereof. The storage device 122 may also include remote storage drives. The storage device 122 may also include an operating system 124. In some embodiments, the storage device 122 may store instructions that enable the operating system 124 to receive input from a stylus 118. For example, the storage device 122 may store one or more drivers that enable the operating system 124 to communicate with a stylus 118 through a Bluetooth receiver 120 or an I/O device interface 114. In some embodiments, the drivers may be stored in the memory device 104. The memory device 104 may include instructions used by a computing system 100 to communicate with a stylus 118 in a similar manner as described in reference to the operating system 124 above.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., a sensor, a sensor controller, additional wireless hardware components, etc.). Furthermore, any of the functionalities of the stylus 118 may be partially, or entirely, implemented in hardware and/or the I/O devices 116. For example, the functionality may be implemented with an application specific integrated circuit, in logic implemented in a processor in the stylus 118, in a sensor controller in the stylus 118, in a co-processor, or in any other device.

Figure 2:
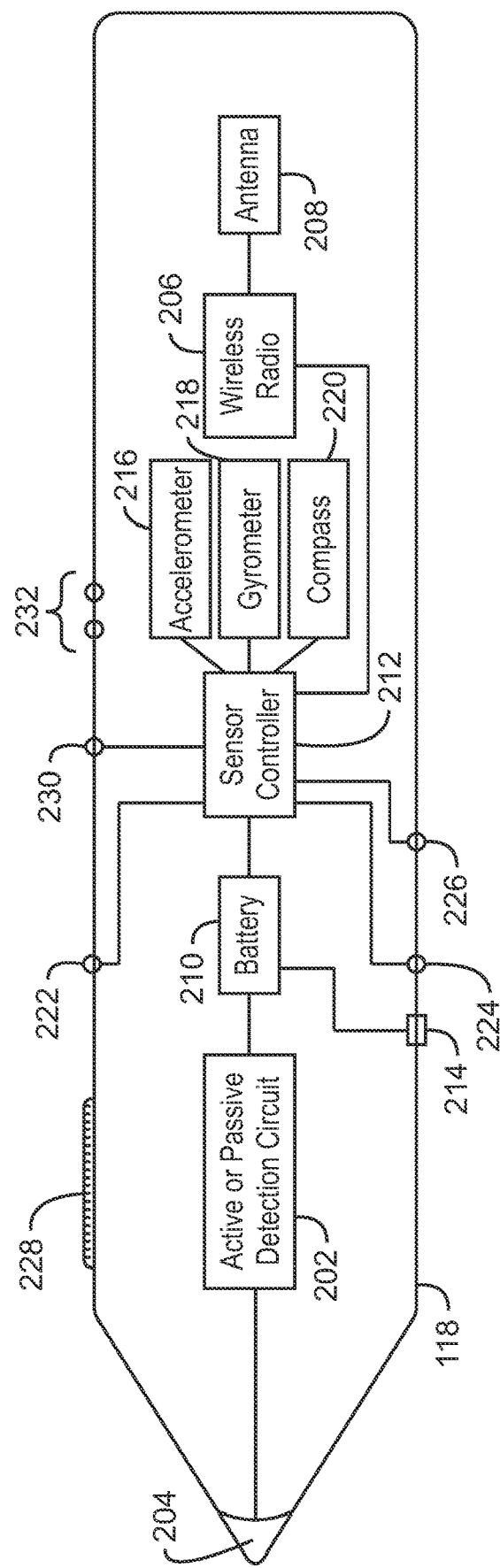
FIG. 2 is a block diagram of an example of a stylus that generates an input value based on sensor data and a gesture event.

FIG. 2 is a block diagram of an example of a stylus that generates an input value based on sensor data and a gesture event. As discussed above, a stylus can include any suitable electronic device that can detect user input and transmit data based on the user input to a computing device. In some embodiments, the stylus 118 can transmit data to a computing device, such as the computing system 100 of FIG. 1.

The stylus 118 can include an active or passive detection circuit 202. The active or passive detection circuit 202 can detect if the stylus 118 is to communicate with a computing device through the spring tip 204 or through a wireless radio 206, or through a cable. For example, a spring tip 204 can engage the surface of a display device. In some examples, the spring tip 204 may allow the stylus 118 to transmit data to a display device using an inductive detection technique, among others. In some embodiments, the stylus 118 may also include an ink cartridge in the spring tip 204 that can allow the stylus 118 to function as a pen. In some embodiments, the wireless radio 206 can transmit data from the stylus 118 to a computing device when the spring tip 204 of the stylus 118 is not in contact with a display device of a computing device. For example, the wireless radio 206 may enable the transmission of data from the stylus 118 to a computing device through a wireless protocol, such as Bluetooth, WIFI, or Zigbee, among others. In some examples, the stylus 118 may also include an antenna 208 that can broadcast the data for the wireless radio 206, which enables data transmission between a stylus 118 and a computing device.

In some embodiments, the stylus 118 may also include a battery 210 that provides power to the active or passive detection circuit 202, wireless radio 206, antenna 208, and a sensor controller 212, among others. In some examples, the battery 210 may receive a charge through a power connector 214. In some embodiments, the power connector 214 may receive power to charge the battery 210 from an adaptor that stores the stylus 118 while providing power to the power connector 214. In some examples, the adaptor may be included in a computing system, or may be externally connected to a computing system through a cable. In some embodiments, the current charge of the battery 210 may be transmitted to a computing device through the spring tip 204 or the wireless radio 206.

In some embodiments, the stylus 118 can detect sensor data from a sensor controller 212. The sensor controller 212 may detect sensor data from any suitable number of sensors, such as an accelerometer 216, a gyrometer 218, and a compass 220. An accelerometer 216 may detect the change in velocity of a computing device. For example, an accelerometer 216 may detect if the stylus 118 is in motion. In some embodiments, a gyrometer 218 may detect the angular velocity of the computing device. For example, a gyrometer 218 may detect the angular velocity of a stylus 118 while the stylus 118 is in motion. A compass 220 may detect the cardinal direction a stylus 118 is either traveling or the cardinal direction a stylus 118 is pointed. In some examples, the compass 220 may aggregate sensor data from multiple sensors to determine the cardinal direction a stylus 118 is pointed. For example, the compass 220 may detect the cardinal direction a stylus 118 is pointed at a particular moment in time based on sensor data from the gyrometer 218 and the compass 220. In some embodiments, the sensor data can include a change in position of a computing device, which is calculated by performing a mathematical "integration" of acceleration and/or rate from the accelerometer or gyroscope, or other such inertial device.

In some embodiments, the sensor controller 212 can generate an input value based on a gesture event and sensor data. For example, the sensor controller 212 can detect a gesture event based on the movement of the stylus 118. In some embodiments, the sensor controller can use the gesture event in combination with sensor data to generate a simulated mouse input or keyboard input. For example, a clutch button 226 may indicate to the sensor controller 212 to enter a mouse emulation mode, wherein sensor data and a gesture event are combined to generate a mouse input value. In some examples, sensor data may indicate the tilt or acceleration of the stylus 118, which can be incorporated with the gesture event and input from a right click button 222 or a left click button 224 to generate a mouse input value to transmit to a computing system. In some embodiments, a scroll wheel 228 may also enable the user to provide additional input that is combined into the mouse input value.

In some embodiments, the sensor controller 212 can generate keyboard input values based on the gesture event and the sensor data. For example, certain motions captured as a gesture event may correspond with alphanumeric input. In some embodiments, the sensor controller 212 can detect sign language motions and translate the sign language motions into keyboard input values based on the sensor data. For example, the sensor controller 212 may detect the tilt of the stylus 118 and transform the gesture event in order to send the correct keyboard input value to the computing system. In some embodiments, the sensor controller 212 can send the keyboard input to a computing device as HID keyboard compliant data.

In some embodiments, a pairing button 230 enables the stylus 118 to activate a discovery and recognition process with a computing device. For example, a stylus 118 may not be able to transmit data to a computing device without a pairing process that establishes a communication channel between the stylus 118 and the computing device. In some examples, the stylus 118 can transmit data to a computing device after the pairing process is complete.

In some embodiments, the stylus 118 may also include indicators 232 that can provide status information. For example, the indicators 232 can provide status information related to the pairing progress between the stylus 118 and a computing device, battery status of the stylus, and wireless communication status, among others. In some examples, the indicators 232 may provide visual indicators of status information through a light-emitting diode (LED) or an organic light-emitting diode (OLED).

It is to be understood that the block diagram of FIG. 2 is not intended to indicate that the stylus 118 is to include all of the components shown in FIG. 2. Rather, the stylus 118 can include fewer or additional components not illustrated in FIG. 2 (e.g., a microphone, a laser pointer, a processor, additional wireless hardware components, etc.).

Figure 3:
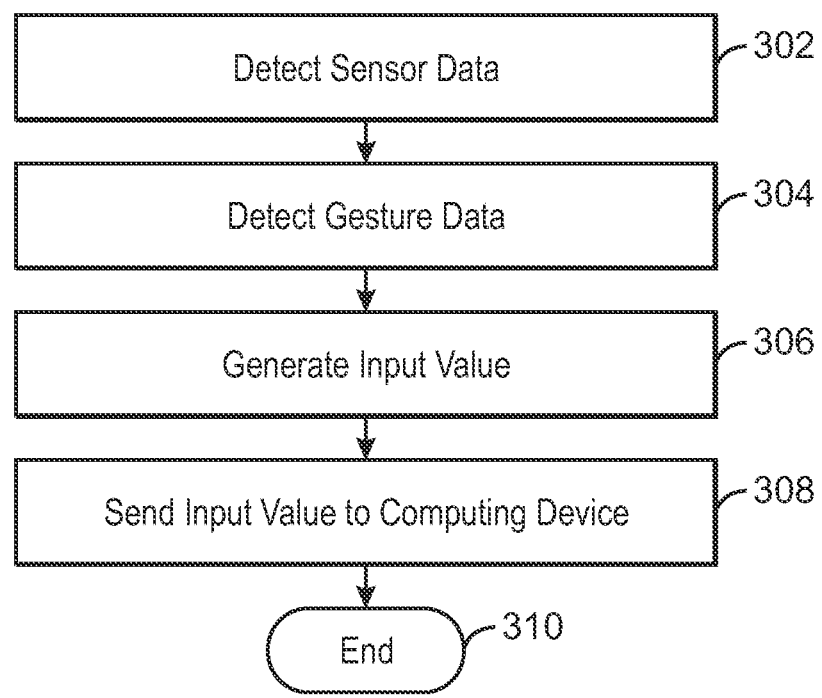
FIG. 3 is a process flow diagram for an example method of generating an input value based on sensor data and a gesture event.

FIG. 3 is a process flow diagram for an example method of generating an input value based on sensor data and a gesture event. The method 300 can be implemented with a computing system, such as the computing system 100 of FIG. 1.

At block 302, a stylus 118 detects sensor data. As discussed above, the stylus 118 can include any suitable number of sensors. In some embodiments, the sensors can include an accelerometer, a gyrometer, and a compass, among others. The accelerometer may detect the change in velocity of the stylus 118 and the gyrometer may detect the angular velocity of the stylus 118. In some embodiments, a compass may detect the cardinal direction the stylus 118 is either pointed or traveling.

At block 304, a stylus 118 may detect a gesture event. In some embodiments, the gesture event may include movement patterns of the stylus 118 that can enable a directional indication of an object through pointing, operate as an input device, or sign language recognition, among others. For example, the gesture event from the stylus 118 can indicate that the stylus 118 is selecting a particular region of a display device. In other examples, the gesture event from the stylus 118 may indicate the detection of a pattern that matches an input value. For example, moving the stylus 118 in the shape of an alphanumeric character in free space may indicate that the stylus 118 is to transmit a keyboard input value for a particular alphanumeric character.

At block 306, the stylus 118 may generate an input value based on the sensor data and the gesture event. In some embodiments, the input value may represent a keyboard stroke, a mouse input value, or a combination of a keyboard stroke and a mouse input value. For example, the gesture event may be detected at a certain angle of tilt. In some examples, the stylus 118 can adjust the gesture event using the detected angle of tilt to ensure the correct keyboard input values or mouse input values are transmitted to a computing device.

At block 308, the stylus 118 sends the input value to a computing device. As discussed above in reference to FIG. 2, the stylus 118 may transmit data to a computing device through a spring tip if the stylus 118 is in contact with a display device. In other examples, a stylus 118 may transmit an input value to a computing device through a wireless radio if the stylus 118 is not in contact with a display device. The process flow ends at block 310.

The process flow diagram of FIG. 3 is not intended to indicate that the steps of the method 300 are to be executed in any particular order, or that all of the steps of the method 300 are to be included in every case. Further, any number of additional steps may be included within the method 300, depending on the specific application. For example, the method 300 may also include detecting pairing information related to the ability of the stylus 118 to transmit data to a computing device. In some examples, the method 300 may also include providing information related to the operation of the stylus through indicators. Furthermore, a stylus 118 may be used with any suitable number of additional styli 118 to transmit data to a display device, such as a whiteboard, among others.

Figure 4:
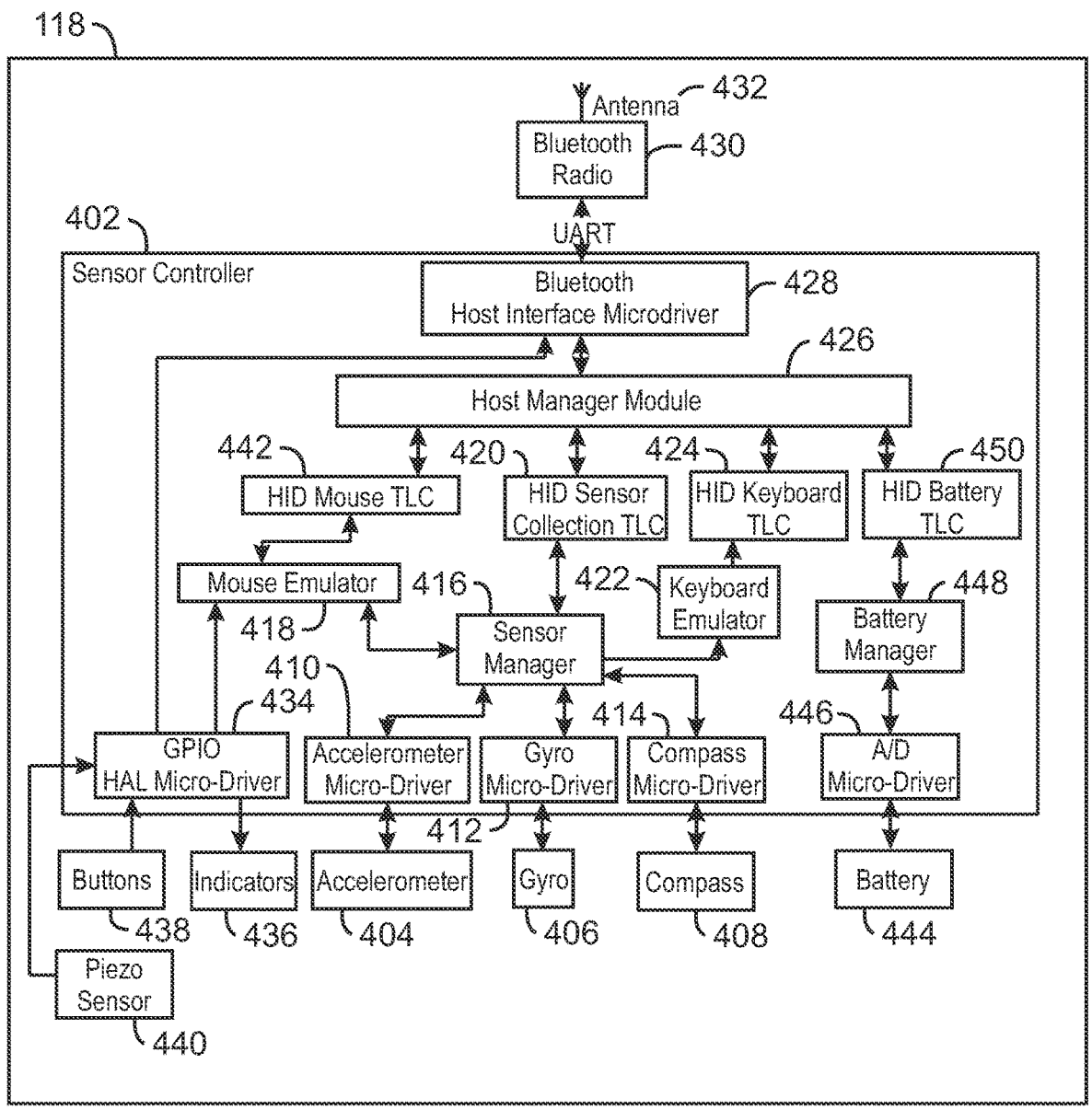
FIG. 4 is a block diagram of an example of a sensor controller that can generate an input value based on sensor data and a gesture event.

FIG. 4 is a block diagram of an example of a stylus 118 that can generate an input value based on sensor data and a gesture event. The stylus 118 can include a sensor controller 402, which can receive sensor data from any suitable number of sensors, such as an accelerometer 404, a gyrometer 406 (also referred to herein as gyro), and a compass 408. The sensors 404, 406, and 408 can send sensor data to micro-drivers, such as 410, 412, and 414. In some embodiments, the accelerometer micro-driver 410 can receive data from a particular accelerometer sensor 404. Furthermore, the gyrometer micro-driver 412 can receive data from a particular gyrometer 406 and a compass micro-driver 414 can receive data from a particular compass 408.

In some embodiments, the accelerometer micro-driver 410, the gyrometer micro-driver 412, and the compass micro-driver 414 can send sensor data to a sensor manager 416. The sensor manager 416 can process the sensor data by transforming the sensor data using a variety of algorithms. For example, the sensor manager 416 may derive a fused inclination angle about the X, Y, and Z axis using sensor data from any suitable number of sensors 404, 406, and 408. In some embodiments, the sensor manager 416 may detect a gesture event based on the sensor data. For example, the sensor manager 416 may aggregate sensor data to detect patterns or complex movements of the stylus 118.

In some embodiments, the sensor manager 416 can send the transformed sensor data and a gesture event to a mouse emulator 418, a HID sensor collection TLC 420 or a keyboard emulator 422. The keyboard emulator 422 can translate the data from the sensor manager 416 into a keyboard stroke. For example, the sensor manager 416 may incorporate a gesture event along with sensor data, such as tilt and movement of the stylus 118, into a keyboard stroke. In some embodiments, the gesture event may translate into any suitable number of keyboard strokes. In some examples, the keyboard emulator 422 may perform calculations on the sensor data received from the sensor manager 416. For example, the keyboard emulator may correct for parallax, or the difference in the apparent position of the stylus 118. In some embodiments, the keyboard emulator 422 may determine keyboard strokes based on the tilt of the stylus 118 while the keyboard stroke gesture is detected.

The keyboard stroke may be sent from the keyboard emulator 422 to a human interface device keyboard top level collection (also referred to herein as HID keyboard TLC) 424. The HID keyboard TLC 424 can translate the keyboard stroke from the keyboard emulator 422 into HID compliant data and send the HID compliant data to the host manager module 426. The host manager module 426 can aggregate HID compliant data from any suitable number of HID drivers and send the aggregated data as an input value to a Bluetooth host interface micro-driver (also referred to herein as a Bluetooth micro-driver) 428. The Bluetooth micro-driver 428 can exchange protocol messages with a Bluetooth radio 430 over a hardware interface including a universal asynchronous receiver/transmitter, among others. The Bluetooth micro-driver 428 can include various formats in the protocol message, such as printable characters as defined by a HID-AT command/response specification, among others. The Bluetooth radio 430 can send the protocol message wirelessly through an antenna 432 according to various HID and Bluetooth specifications, such as the specification of the Bluetooth system 4.0, or the Human Interface Device (HID) Profile version 1.0, among others.

In some embodiments, the sensor manager 416 can also send sensor data and a gesture event to a mouse emulator 418. The mouse emulator 418 can combine the sensor data with additional data received from the GPIO HAL micro-driver 434. For example, the GPIO HAL micro-driver 434 may send data to indicators 436 and receive data from buttons 438, and a piezoelectric sensor 440. The indicators 436 can indicate that the sensor controller 402 is in a particular state. For example, the indicators 436 may indicate that the sensor controller 402 is in a stylus 118 that is charging, in a stylus 118 that is low in power, or in a stylus 118 that is not paired with a computing device, among others. In some embodiments, the buttons 438 can include a pairing button, a clutch button, a right click button, and a left click button. As discussed above in regard to FIG. 2, the clutch button can indicate to the sensor controller 402 to begin detecting input from the stylus 118 as a mouse, along with a right click button and left click button, which simulate clicking the right and left mouse buttons. In some examples, the data from the right click and left click buttons can be sent to the mouse emulator 418 through the GPIO HAL micro-driver 434. The piezoelectric sensor 440 can generate a voltage in response to deflection. In some embodiments, the piezoelectric sensor 440 may initiate a haptic indicator in response to a change in pressure or acceleration in a device. For example, the piezoelectric sensor 440 may vibrate the device in response to certain events. In some examples, if a device is operating as a mouse and the cursor points to a region that is not on the display screen, the piezoelectric sensor 440 may initiate a mechanical response, such as a vibration or a shock, or an audio sound. In some embodiments, data from the piezoelectric sensor 440 may be sent to the Bluetooth Host Interface micro-driver 428 through the GPIO HAL micro-driver 434. In some embodiments, the piezoelectric sensor 440 can be used to provide power to additional sensors in the stylus. For example, the stylus 118 may enter a sleep state after a period of inactivity, in which various sensors 404, 406, 408 and components within the stylus 118 may be powered down. In some examples, the piezoelectric sensor 440 may generate a voltage in response to an event. The voltage generated by the piezoelectric sensor 400 can be used as an indication to provide power to additional sensors 404, 406, 408 and components within the stylus 118.

In some embodiments, the mouse emulator 418 can perform calculations based on the sensor data and the data from the buttons 438. For example, the mouse emulator 418 may also account for parallax and modify the gesture event based on the sensor data. In some examples, the gesture event that indicates a cursor is to be displayed on a display device may be altered based on sensor data, such as the tilt or change in velocity of a device. In some embodiments, the mouse emulator 418 may also generate a virtual brush stroke that appears as a brush stroke on a display device. In some examples, the mouse emulator 418 may change the virtual brush stroke based on sensor data. For example, a greater degree of tilt of a stylus 118 may result in the mouse emulator 418 creating a broader or finer virtual brush stroke. In some embodiments, the mouse emulator 418 can send data to the HID Mouse TLC 442, which can generate HID compliant mouse data and send the HID compliant mouse data to the Host Manager Module 426. The Host Manager Module 426 can send the HID compliant mouse data to a computing device through the Bluetooth radio 430 and Bluetooth Host Interface Micro-driver 428.

In some embodiments, a stylus 118 may detect a gesture event that indicates complex input values, such as combined mouse input values and keyboard input values. In some examples, the sensor data and a gesture event from the stylus 118 can be sent to both the keyboard emulator 4422 and the mouse emulator 418, which can generate mouse input values and keyboard input values based on the sensor data and the gesture event.

In some embodiments, a device may include a battery 444 that provides power for the device. The battery 444 may communicate the current electrical state to an analog to digital micro-driver (also referred to as A/D micro-driver) 446 in the sensor controller 402. The A/D micro-driver 446 can detect data from the battery 444 and provide the data in a particular format for the battery manager 448. In some embodiments, the battery manager 448 can calculate the current charge of the battery 444, the charging rate of the battery 444, and the like. In some examples, the battery manager 448 can send data regarding the battery 444 to a HID battery TLC 450, which can apply a HID compliant format to the data regarding the battery 444. The HID compliant data for the battery 444 can then be sent to the Bluetooth radio 430 through the Bluetooth Host Interface Micro-driver 428 and the Host Manager Module 426. The Bluetooth radio 430 can broadcast the data regarding the battery 444 through an antenna 432.

It is to be understood that the block diagram of FIG. 4 is not intended to indicate that the computing system sensor controller 402 is to include all of the components shown in FIG. 4. Rather, the sensor controller 402 can include fewer or additional components not illustrated in FIG. 4 (e.g., additional micro-drivers, additional HID drivers, a USB host interface micro-driver, etc.). For example, a USB Host Interface may be included in sensor controller 402 to send an input value base on sensor data and a gesture event to a computing system using a USB protocol.

Figure 5:
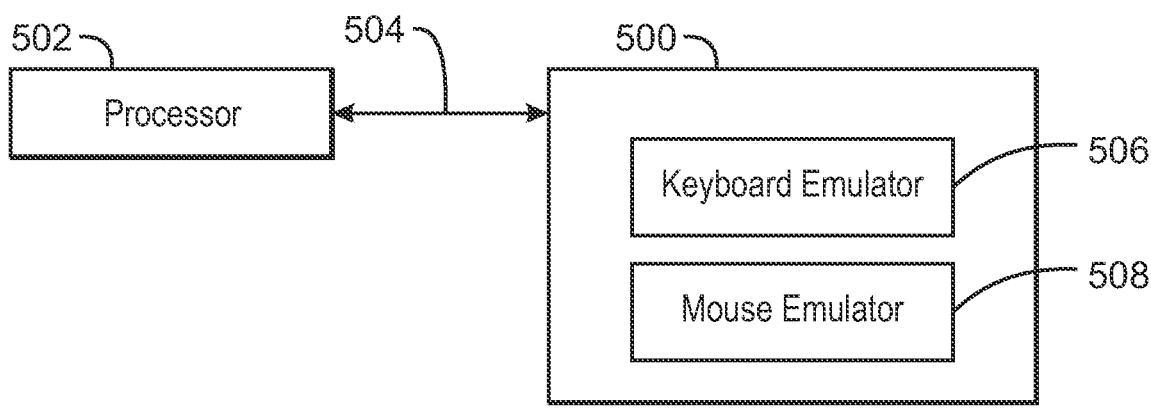
FIG. 5 is a tangible, non-transitory computer-readable medium that can enable a stylus to send an input value based on sensor data and a gesture event to a computing device.

FIG. 5 is a tangible, non-transitory computer-readable medium that can enable a stylus to send an input value based on sensor data and a gesture event to a computing device. The tangible, non-transitory, computer-readable medium 500 may be accessed by a processor 502 over a computer interconnect 504. Furthermore, the tangible, non-transitory, computer-readable medium 500 may include code to direct the processor 502 to perform the steps of the current method.

The various software components discussed herein may be stored on the tangible, non-transitory, computer-readable medium 500, as indicated in FIG. 5. For example, a keyboard emulator 506 may be adapted to direct the processor 502 to detect a keyboard input value based on sensor data and a gesture event and send the keyboard input value to a computing system. In some embodiments, a mouse emulator 508 can generate a mouse input value based on sensor data and a gesture event and send the mouse input value to a computing device. It is to be understood that any number of additional software components not shown in FIG. 5 may be included within the tangible, non-transitory, computer-readable medium 500, depending on the specific application.

Example 1

A method for generating an input value is described herein. The method can include detecting sensor data in a stylus and detecting a gesture event with the stylus. The method can also include generating an input value based on the gesture event and the sensor data. Furthermore, the method can include sending the input value from the stylus to a computing device.

In some embodiments, the method can generate an input value that comprises a keyboard input value, a mouse input value, or a virtual brush stroke. In some examples, the keyboard input value can include any alphanumeric character that a keyboard can generate. In some embodiments, the method can also detecting gesture events, wherein detecting the gesture events includes detecting a movement of the stylus that corresponds with an input operation. In some examples, the input operation can include operations that transmit alphanumeric characters, sign language operations or directional indication through pointing, among others.

Example 2

A stylus for generating an input value is described herein. The stylus includes a sensor controller that executes computer-readable instructions, and a storage device to store the computer-readable instructions. The computer-readable instructions can direct a sensor controller to detect sensor data in the sensor controller. The computer-readable instructions can also direct a sensor controller to detect a gesture event with the stylus and generate an input value based on the gesture event and the sensor data. Furthermore, the computer-readable instructions can direct a sensor controller to send the input value from the stylus to a computing device.

In some embodiments, the stylus can include any suitable number of sensors, such as an accelerometer, a gyrometer, and a compass, among others. In some embodiments, the sensor data detected by the sensors can include a tilt of the stylus, a cardinal direction of the stylus, or a speed of the stylus. In some examples, the input value generated by the stylus can be based on a tilt of the stylus to correct for parallax.

Example 3

At least one non-transitory machine readable medium comprising a plurality of instructions stored thereon is descried herein. In response to being executed on a stylus, the instructions can cause the stylus to detect sensor data in the stylus and detect a gesture event with the stylus. The instructions can also cause the stylus to generate an input value based on the sensor data and the gesture event. Furthermore, the instructions can cause the stylus to send the input value from the stylus to a computing device.

In some embodiments, the instructions can cause the stylus to send the input value from the stylus to the computing device by touching the stylus to a display device. Alternatively, the instructions can cause the stylus to send the input value from the stylus to the computing device by transmitting the input value to the computing device through a data exchange protocol. In some embodiments, the instructions can cause the stylus to detect a current charge level of a battery of the stylus and transmit the current charge level of the battery to the computing device.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A mobile computing device comprising:
a housing dimensioned to be carried by a user;
a touch screen carried by the housing;
a sensor carried by the housing;
wireless communication circuitry to communicate via a Wifi protocol;
a Bluetooth radio to communicate with an electronic stylus via a Bluetooth protocol;
at least one memory; and
processor circuitry to:
cause the touch screen to display a virtual stylus stroke in response to one or more first signals associated with use of the electronic stylus, the one or more first signals associated with a tilt angle of a housing of the electronic stylus, a characteristic of the virtual stylus stroke corresponding to the tilt angle; and
cause the touch screen to display a keyboard input value in response to one or more second signals associated with a direction of movement of the electronic stylus.

2. The mobile computing device as defined in claim 1, wherein the one or more first signals are to be detected via the touch screen when a tip of the electronic stylus is in contact with the touch screen.

3. The mobile computing device as defined in claim 1, wherein the Bluetooth radio is to detect the one or more first signals.

4. The mobile computing device as defined in claim 1, further including a power source, a portion of the housing of the mobile computing device to provide access to a connection to charge a battery of the electronic stylus.

5. The mobile computing device as defined in claim 1, wherein the characteristic is a width of the virtual stylus stroke.

6. The mobile computing device as defined in claim 1, wherein the Bluetooth radio is to receive power level information from the electronic stylus.

7. The mobile computing device as defined in claim 1, wherein the Bluetooth radio is to detect the one or more second signals associated with the direction of movement of the electronic stylus.

8. The mobile computing device as defined in claim 1, wherein the tilt angle is relative to the touch screen.

9. The mobile computing device as defined in claim 1, further including a power source, a portion of the housing to provide access to a connection to charge a battery of the electronic stylus.

10. A system comprising:
an electronic stylus; and
a mobile computing device, the mobile computing device including:
a housing;
a display screen carried by the housing;
wireless communication circuitry to communicate via at least one of a Wifi protocol or a Bluetooth protocol;
at least one storage device; and
processor circuitry to:
cause a virtual stylus stroke to be displayed via the display screen in response to first movement of the electronic stylus, a characteristic of the virtual stylus stroke corresponding to a tilt angle of a housing of the electronic stylus; and
cause a keyboard input value to be displayed in a text field associated with the display screen in response to second movement of the electronic stylus relative to the display screen.

11. The system as defined in claim 10, wherein the electronic stylus includes at least one sensor to output one or more signals associated with a direction of travel of the electronic stylus.

12. The system as defined in claim 10, wherein the tilt angle is relative to the display screen.

13. The system as defined in claim 10, wherein the mobile computing device further includes a power source, a portion of the housing of the mobile computing device to provide access to a connection to charge a battery of the electronic stylus.

14. The system as defined in claim 13, wherein the housing of the mobile computing device is to receive the electronic stylus to enable charging of the electronic stylus.

15. The system as defined in claim 10, wherein the display screen is a touch screen, the touch screen to detect one or more signals from the electronic stylus when a tip of the electronic stylus is in contact with the touch screen.

16. The system as defined in claim 10, wherein the wireless communication circuitry is to detect one or more signals from the electronic stylus.

17. The system as defined in claim 10, wherein the characteristic includes width of the virtual stylus stroke.

18. The system as defined in claim 10, wherein the electronic stylus includes a wireless radio to communicate with the wireless communication circuitry of the mobile computing device.

19. The system as defined in claim 10, wherein the mobile computing device is to receive power level information from the electronic stylus.

20. A system comprising:
a stylus, including:
a stylus housing having a first end and a second end opposite the first end, the stylus housing having a spring-loaded tip at the first end;
a battery carried by the stylus housing;
an antenna;
at least one sensor carried by the stylus housing, the at least one sensor to output one or more first signals associated with a tilt angle and movement of the stylus housing; and
a first wireless radio to communicate one or more second signals corresponding to the one or more first signals via a Bluetooth protocol; and
an electronic device including:
a second wireless radio to obtain the one or more second signals;
a display screen; and
processor circuitry to cause a virtual stylus stroke corresponding to at least one of the tilt angle or the movement of the stylus housing to be displayed as a keyboard input value in a text field via the display screen in response to the one or more first signals from the at least one sensor.

21. The system of claim 20, wherein the at least one of the tilt angle or the movement of the stylus housing correspond to the stylus writing an alphanumeric character.

22. The system of claim 20, wherein the one or more second signals are indicative of a language input corresponding to the at least one of the tilt angle or the movement of the stylus housing.

23. The stylus of claim 22, wherein the movement of the stylus housing corresponds to a gesture.

24. The system of claim 20, wherein the tilt angle is relative to the display screen.

25. The system of claim 20, wherein the one or more first signals are associated with acceleration of the stylus housing.

* * * * *

UNITED STATES PATENT AND TRADEMARK OFFICE
CERTIFICATE OF CORRECTION

PATENT NO. : 11,243,617 B2  
APPLICATION NO. : 17/118950  
DATED : February 8, 2022  
INVENTOR(S) : James Trethewey et al.

It is certified that error appears in the above-identified patent and that said Letters Patent is hereby corrected as shown below:

In the Claims

Column 14, Line 25 (Claim 23), replace "The stylus of claim 22," with --The system of claim 22,--

Signed and Sealed this  
Sixth Day of May, 2025

Coke Morgan Stewart  
*Acting Director of the United States Patent and Trademark Office*